Figure 1:
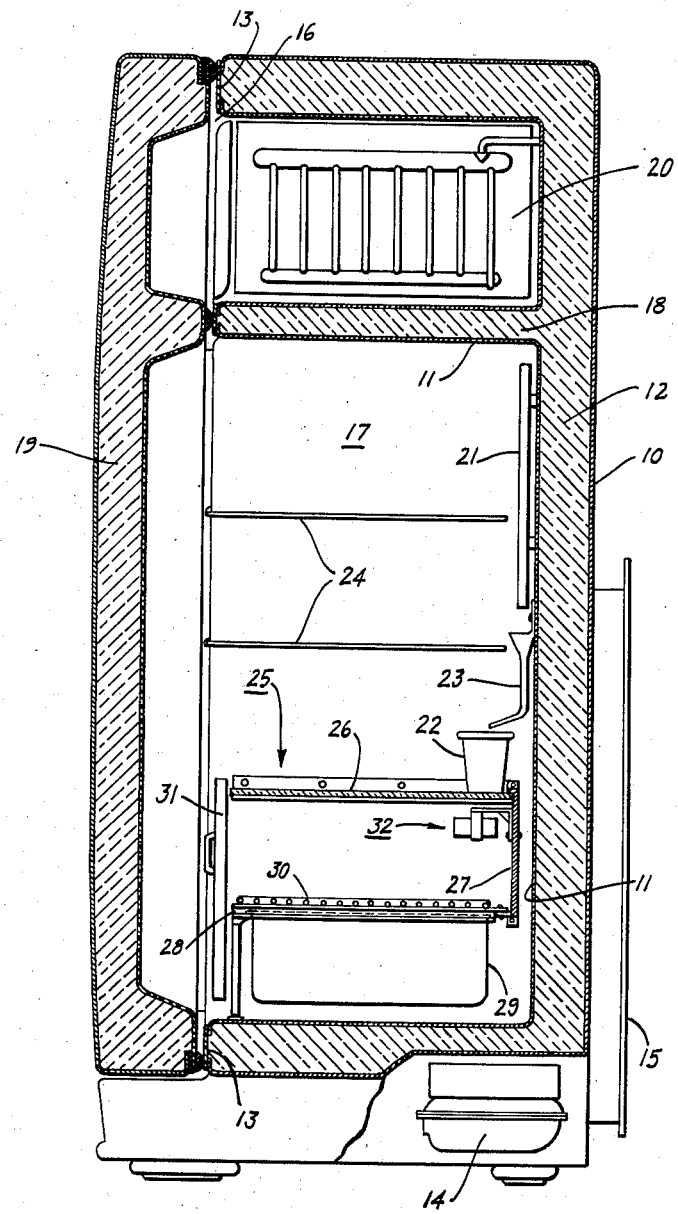

Sept. 9, 1958     H. W. SCHAEFER ET AL     2,851,366
METHOD FOR PRESERVING FOODS Filed Feb. 7, 1955     2 Sheets-Sheet 1

INVENTORS
HAROLD W. SCHAEFER
LLOYD A. STAEBLER
FORREST P. SPEICHER

BY Carl H. Synnestvedt

AGENT

Sept. 9, 1958    H. W. SCHAEFER ET AL    2,851,366
METHOD FOR PRESERVING FOODS
Filed Feb. 7, 1955    2 Sheets-Sheet 2

INVENTORS
HAROLD W. SCHAEFER
LLOYD A. STAEBLER
FORREST P. SPEICHER
BY Carl H. Synnestvedt
AGENT United States Patent Office 2,851,366
Patented Sept. 9, 1958

2,851,366
METHOD FOR PRESERVING FOODS

Harold W. Schaefer, Philadelphia, Lloyd A. Staebler, Oreland, and Forrest P. Speicher, Havertown, Pa., assignors to Philco Corporation, Philadelphia, Pa., a corporation of Pennsylvania Application February 7, 1955, Serial No. 486,642

5 Claims. (Cl. 99—192)

Our invention relates to food preservation, having as its broader objective the provision of a novel method of and apparatus for inhibiting or preventing food deterioration which normally results when micro-organisms, such as mold spores and certain types of meat-destroying bacteria, are present.

Considered with greater particularity, it is an object of the invention to control ionization of the atmosphere, in a region of food storage, in such manner as to inhibit the growth of these micro-organisms and thereby to retard deterioration processes. The concepts of the invention are of especial utility in the field of refrigeration, and the following detailed description and the accompanying drawings therefore describe and illustrate the invention in that environment.

It has in the past been suggested that the presence of ions in the atmosphere may influence physiological and biological processes. Although little if any data has been developed, there has been wide speculation on the subject, and there has existed general acceptance of the idea that an excess of positive ions is undesirable, whereas a moderate excess of negative ions is probably beneficial.

Thus far, however, there has been no recognition of the important fact that the growth and development of micro-organisms may be prevented, or inhibited, if proper control is exerted over the condition of ionization of the ambient atmosphere. Notably there has been, prior to our invention, no recognition of the important fact that food deterioration resulting from the growth of micro-organisms, such for example as mold spores and bacteria, may be prevented or inhibited by producing positive atmospheric ions, and releasing such ions in the region of food storage. Recognition of this fact comprises the central concept of our invention and is of substantial significance.

In the field of refrigeration, equipment for maintaining food under optimum desired conditions of temperature and humidity has reach a high degree of development, but no successful step has hitherto been taken to meet one of the central problems which exists in this field. As is now well recognized it is necessary to maintain certain types of refrigerated foods in a relatively high humidity atmosphere, in order to prevent the spoilage which arises from dehydration of the foods. It is an unfortunate fact, however, that certain micro-organisms, which when present have a deleterious effect upon stored foods, flourish in the above mentioned high humidity atmosphere. The result is that refrigerator manufacturers find it necessary either to market equipment which represents a compromise between the requirements imposed by desiccation, on the one hand, and the spoilage which results from the growth of molds and bacteria, on the other, or to accept the fact that foods may be stored within the high humidity compartment for only a relatively short period of time.

With this basic problem in mind, it is an important object of this invention to provide a method of preserving foods under refrigeration, practice of which method and utilization of which apparatus makes it possible fully to achieve the advantages of moist cold storage while at the same time substantially inhibiting the food deterioration which normally results under moist storage conditions. To these general ends the invention contemplates the production of positive atmospheric ions and the release of such ions within the food storage compartment of a refrigerator, whereby to create a positively ionized atmosphere in the region of food storage.

Specifically, it is an object of our invention to extend the time during which foods may be stored well beyond the times achieved by prior practice, it being important to note that, for any given, useful humidity condition, use of the invention makes it possible to effect a substantial extension in the storage time.

In accordance with an important feature of the invention, radioactive means is provided to produce the positive ions released within the food storage compartment, this practice having the advantage of avoiding the production of the dangerous nitrogen oxides and ozone that are produced when a high voltage discharge is used to cause ionization, and, of course, being advantageous in that it is not necessary to supply a high voltage source within the refrigeration equipment. Specifically, we prefer to rely upon radioactive ionization of air by means of alpha particles emitted for example from polonium 210, or by use of soft beta emission such as may be achieved by the use of tritium.

Reference has been made above, and will be made hereinafter, to "atmospheric ions." Within the teaching of this invention the term "atmospheric ions" contemplates ions which may be either gaseous components of the atmosphere, for example oxygen, nitrogen, and water vapor, or particulate components such as dust particles or other air contaminants. The appended claims should be understood with this in mind, and there should also be recognition of the fact that reference herein to a "positively ionized atmosphere," is not intended to exclude the possibility that some negative ions may be present in said atmosphere.

Figure 2:
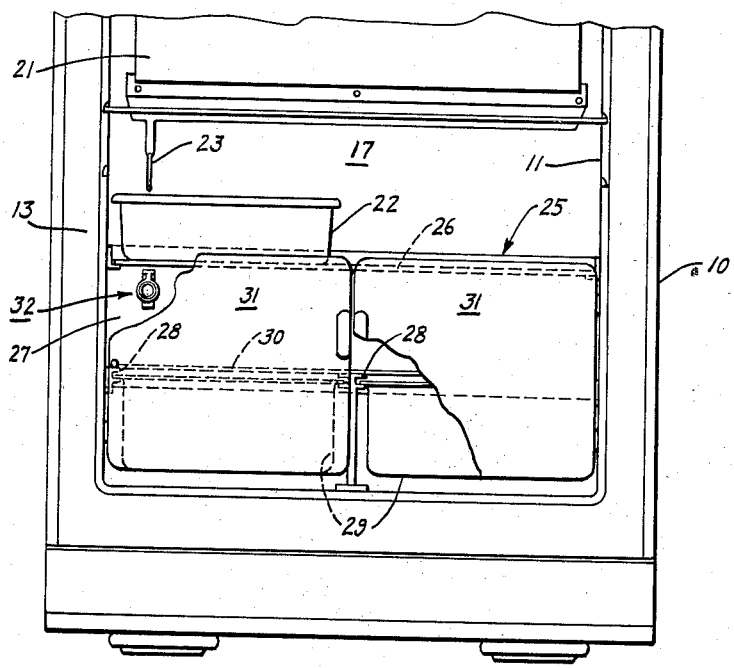
Figure 3:
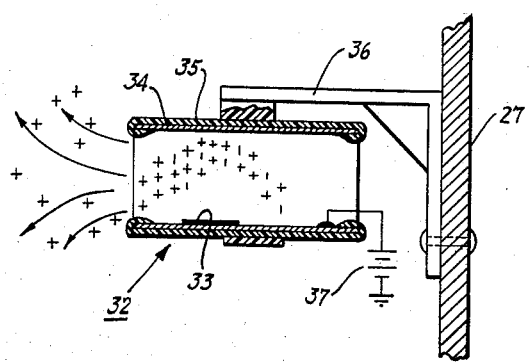

The manner in which the foregoing objects, advantages and features of the invention may best be achieved will be fully understood from a consideration of the following detailed description, taken together with the accompanying drawings, in which:

Figure 1 is a sectional view of a household refrigerator arranged for operation in accordance with the present invention, the view being taken generally through the vertical mid-plane of the refrigerator;

Figure 2 is a fragmentary elevational view of the forward lower portion of a refrigerator of the type shown in Figure 1, parts being broken away to facilitate illustration; and, Figure 3 is a cross sectional view of a device of the type preferably utilized to generate or produce atmospheric ions, and to eliminate ions of one polarity while releasing ions of the other polarity within the refrigerated space.

Now making more detailed reference to the drawings, there is shown a domestic or household refrigerator comprising an outer cabinet 10 and an inner shell or liner member 11, spaced and insulated from the outer shell 10 by means of suitable insulation shown at 12. As is customary, breaker strip means 13 of low thermal conductivity extends about the foreward face or throat of the cabinet and bridges the gap between the outer shell 10 and the inner liner 11, as appears to best advantage in Figure 2. Compressor-condenser apparatus shown at 14, 15 is disposed at the lower rear portion of the refrigerator and, as clearly appears in Figure 1, the space within the cabinet is sub-divided into an upper freezing compartment 16 and a lower food storage compartment 17, by means of a thermally non-conductive partition 18 which thermally isolates the freezing or vapor barrier 18 which thermally isolates the freezing compartment from the food storage compartment and prevents migration of moisture from the latter compartment to the freezer. An insulated door 19, of known type, extends throughout the height of the refrigerator and provides access to the two compartments 16 and 17, this door being provided with suitable gaskets which seal against the aforesaid breaker strip means 13 and against the strip which extends along the forward portion of the partition 18, in the manner illustrated in Figure 1.

In a refrigerator of the kind illustrated, the two compartments are each provided with suitable cooling means, the cooling means for the freezing compartment taking the form of a rectangular evaporator 20 which preferably extends the width and depth of the freezing compartment 16 and defines said compartment. The lower compartment 17 is cooled solely through the agency of a plate-like evaporator 21 supported, in any convenient manner, upon the rear wall of the inner liner 11. In such a refrigerator the lower, plate-like evaporator 21 is periodically defrosted by automatic means which it is not necessary to describe herein, the collected moisture which drains from the evaporator during the defrosting operation being delivered to a receptacle 22, through the agency of a suitable trough and spout structure 23.

In this known type of refrigerator the freezing compartment 16 is held at a uniform zero-zone temperature and the food storage compartment 17 is capable of maintaining desired stabilized "water load" temperatures, for example in a region of 38° F. to 40° F., regardless of changes in the ambient temperature and almost independent of the demands which usage places upon the equipment. It will be understood, of course, that the compressor, condenser, and the two evaporators would in practice be connected in series flow circuit through the agency of suitable suction and feed conduits which it is not necessary to illustrate or describe herein, the present invention not being concerned therewith. If a more complete description of the refrigerator shown here for exemplary purposes is desired, reference may be had to the co-pending application of Malcolm G. Shoemaker, Serial No. 296,995, filed July 3, 1952, and issued April 26, 1955, as Patent No. 2,706,894, or to the co-pending application of Elmer W. Zearfoss, Jr., Serial No. 304,272, filed August 14, 1952, and issued April 12, 1955 as Patent No. 2,705,876, both inventions being assigned to the assignee of the present invention.

Within the main food storage compartment 17, and beneath a pair of shelves 24—24, there is disposed a high humidity compartment or receptacle designated generally by the reference numeral 25, and which receptacle may, as shown, be of a known type suitable for maintaining the fresh and crisp condition of leafy vegetables and uncovered foods. As will later appear, and particularly because provision is made to treat the air within the receptacle in accordance with the principles of this invention, said receptacle may advantageously be used for the storage of meats, for example cold cuts and the like.

While in the broader aspect of our invention a high humidity compartment may be provided in any desired manner, as by the use of "coldwall" cooling of a predetermined limited area of the cabinet, or by disposing a separate higher temperature evaporator within an individual compartment, we prefer to provide a high humidity compartment of the kind shown in the drawings at 25. Conveniently such a compartment may be provided by disposing a sheet of imperforate material 26 horizontally within the food storage compartment 17, and by arranging door, wall, and floor structure subjacent to said sheet and in any convenient manner serving to define a high humidity compartment or space with provision for air circulation past the walls of said compartment or receptacle, in order to maintain suitable refrigerating temperatures within the latter.

In the embodiment illustrated a rear wall 27 extends downwardly from the back edge of the top 26 of high humidity receptacle 25, said rear wall being spaced somewhat from the adjacent portion of the inner liner 11 and serving to provide rear support for channel members 28 (see particularly Figure 2) within which are received a pair of crisper drawers or baskets 29—29 forming the lower half of the compartment or receptacle 25. Upon the upper surface of the channel members 28 is carried a wire type shelf 30 upon which meats or other foods may be disposed. A pair of doors 31—31 close the front of the receptacle and provide access thereto. As will be understood without further description, air cooled by the plate type evaporator 21 flows downwardly along the rear wall 11, past the back of high humidity receptacle 25 and thence forwardly around the crisper drawers 29, returning upwardly through the refrigerator past the doors 31, all in accordance with common practice as respects crisper drawers.

In particular accordance with the present invention, provision is made to produce unipolar atmospheric ions and to release said ions within the compartment or receptacle 25. The apparatus is designated generally by the reference character 32, and includes radioactive means (see means 33, Figure 3) the alpha radiation of which is utilized to cause ionization of air within receptacle 25.

While the apparatus 32 may take different forms, it has been found suitable to use equipment of the kind shown in the drawings and described in what follows. Such equipment employs polonium 210 as the radioactive substance shown at 33.

The ion emitter 32 comprises a metal tube 34 provided with a coating or cover 35 of suitable material which is electrically non-conductive, the tube being supported within compartment 25, by bracket structure 36. The metal tube has secured to an inside wall portion thereof the aforementioned strip of polonium foil 33. Alpha emission from the polonium produces a zone of intense ionization of the air in the immediate vicinity of the radioactive material 33. A suitable relatively low voltage source (37) of electric potential has its positive terminal connected to the metal of said inside wall portion, the inside of the tube being open to the compartment 25 but the tube being electrically insulated from the walls of that compartment. This results in maintaining an electrostatic field between the tube and ground. The voltage is not critical; a potential difference of about 300 volts has been found to be entirely satisfactory. A portion of the field is indicated diagrammatically by the arrows indicating the direction in which force will be exerted on the positive ions, designated by the algebraic plus signs. When an ion is formed within the tube it is acted on by the electrostatic force and moves in the direction of the flux lines. Negatively charged ions move to the positively charged cylinder where they lose their charge and become neutral. Positively charged ions, on the other hand, move toward the end of the tube 32, as illustrated in Figure 3, driven by the electric field and pass outwardly of the tube, thus being released within the receptacle or compartment 25. The present invention is not concerned with the ion emitter per se—which is of known type—except insofar as it cooperates as a part of the overall combination which forms the subject matter of this invention in its apparatus aspect. Therefore, and because detailed information respecting the construction and operation of suitable emitters is available in the literature, further and more detailed description of the emitter is not necessary herein.

Within the purview of this invention other means may be utilized to produce atmospheric ions, the general requirements for such means being that the apparatus should be simple and inexpensive, should not require elevated voltage, and operation thereof should produce no objectionable or dangerous by-products.

From the foregoing description the operational aspects of our invention will be understood. However some additional consideration of certain tests which have been made, and of the nature of the results achieved, will be helpful. In establishing the nature and extent of the results achieved, the following tests were conducted for the purpose of determining and recording the gains in food storage time.

Two refrigerators of the kind shown and described herein were provided, each having a high humidity chamber in a portion of the main food storage compartment. Each chamber was sealed, and each included thermocouple means utilized to sense the temperature within the compartment. One chamber was without ionization apparatus, and served as a control, whereas the other chamber contained ionizing equipment of the kind shown and described herein, said equipment having been adjusted to produce and release positive ions. The temperature within the control chamber was maintained in the range from 38° F. to 40.5° F., while the temperature in the ion chamber was maintained in the range from 38° F. to 40° F., temperatures being recorded at the same time on each morning of successive test days. The foods tested were taken from the same samples, and each chamber was opened for a total of 15 minutes every day, to create conditions corresponding to those which are encountered when the apparatus is undergoing use in the home. The gain in storage time achieved by practice of the concepts of this invention was very substantial, as is indicated below, and it will be appreciated that this gain made it possible fully to realize the benefits of moist cold storage. All food samples were stored in uncovered glass dishes.

Sliced cold cuts became slimy and unusable (indicating excessive bacterial growth) after 185 hours in the control chamber, but were fresh and showed no slime in the ion chamber, until 281 hours. This represents a gain of 96 hours, or 4 days.

With respect to fresh peaches and sliced tomatoes, mold was detected on each sample at the end of 257 hours in the control chamber. In the ion chamber, mold appeared upon the sliced tomatoes at 305 hours (a gain of 48 hours, or 2 days), whereas mold appeared on the fresh peach sample, in the ion chamber, after 425 hours, the gain attributable to the use of positive ionization being 168 hours, or 7 days.

During a 425 hour test, peas showed no objectionable deterioration in the ion chamber, whereas peas stored in the control chamber showed mold at 305 hours. In this instance the test was not conducted for a length of time sufficient to determine the actual gain in storage time, but it is clear that a gain of no less than 120 hours, or 5 days, was shown.

Mashed potatoes and cream cheese in the control chamber showed mold after 305 hours, whereas the same foods developed mold in the ion chamber between an inspection made at 360 hours and completion of the test at 425 hours. This represents an increase in storage time of at least 55 hours, or about 2.3 days.

An open dish of canned tomatoes stored in the control chamber showed mold after 329 hours, whereas only a microscopic amount of mold was found on the ion chamber sample after 425 hours, the nature and amount of the latter mold indicating that the growth was less than 24 hours old. This indicates an increase of storage time in the ion chamber of approximately 74 hours, or about 3.1 days.

An open dish of canned peaches in the control chamber became moldy after 260 hours, although no mold was detected in the ion chamber until 425 hours. This represents a gain of 165 hours, or about 6.8 days.

It is to be understood that the foregoing results are typical of the results achieved on a number of similar tests.

It is clear from the foregoing description, and test data, that the method concepts of this invention constitute a significant contribution in the field of food preservation. The effectiveness of the invention in inhibiting growth of mold spores and meat-destroying bacteria is such as to make possible substantial extension of the time during which foods may be preserved under high humidity conditions, the invention serving also to insure fresh and palatable appearance of the food throughout the entire period of storage.

We claim:

1. In a process of storing food in a moist, cool environment and over an extended period of time: maintaining the atmosphere of said environment ionized and polarized by positive atmospheric ions, substantially throughout said period.

2. In a process of preserving food during an extended period of time, in contact with a refrigerated atmosphere containing substantial humidity: maintaining positive ionization in said atmosphere, during said period, by steps including a release of positive ions in said atmosphere.

3. In a process of preserving food during an extended period of time: maintaining around said food, during said period, a cool atmosphere containing substantial humidity and similarly maintaining positive ionization in said atmosphere by steps comprising a release of positive ions within, and a removal of negative ions from said atmosphere.

4. A method of storage of fresh food for a number of days, comprising the steps of maintaining a refrigerated but relatively humid atmosphere around said food during such time and similarly maintaining a concentration of positive atmospheric ions in said atmosphere, with at least a substantial preponderance of said positive atmospheric ions over any negative atmospheric ions in said atmosphere.

5. In the method of claim 4, maintaining said ionization by radioactively releasing positive atmospheric ions in said atmosphere while electrostatically removing negative atmospheric ions from said atmosphere.

References Cited in the file of this patent

UNITED STATES PATENTS

| | | |
|---|---|---|
| 788,480 | Lieber | Apr. 25, 1905 |
| 2,015,282 | Pacini | Sept. 24, 1935 |
| 2,246,676 | Hainsworth | June 24, 1941 |
| 2,257,801 | Hull | Oct. 7, 1941 |
| 2,456,909 | Brasch | Dec. 21, 1948 |
| 2,509,181 | Zimmerman | May 23, 1950 |
| 2,594,777 | Hicks | Apr. 29, 1952 |

OTHER REFERENCES

"Bacterial Chemistry & Physiology," Porter, page 166.
"Antiseptics, Disinfectants, Fungicides and Sterilization," Reddis (773–775).